US009652450B1

(12) United States Patent
Sacaleanu et al.

(10) Patent No.: US 9,652,450 B1
(45) Date of Patent: May 16, 2017

(54) RULE-BASED SYNTACTIC APPROACH TO CLAIM BOUNDARY DETECTION IN COMPLEX SENTENCES

(71) Applicant: INTERNATIONAL BUSINESS MACHINES CORPORATION, Armonk, NY (US)

(72) Inventors: Bogdan Sacaleanu, Dublin (IE); Alice Marascu, Dublin (IE); Charles Jochim, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/203,005

(22) Filed: Jul. 6, 2016

(51) Int. Cl.
*G06F 17/27* (2006.01)

(52) U.S. Cl.
CPC ........ *G06F 17/2785* (2013.01); *G06F 17/271* (2013.01); *G06F 17/274* (2013.01)

(58) Field of Classification Search
USPC ...................................................... 704/1–10
See application file for complete search history.

(56) References Cited

U.S. PATENT DOCUMENTS

| 7,113,905 | B2 | 9/2006 | Parkinson et al. | |
| 7,809,552 | B2 | 10/2010 | Pan et al. | |
| 2009/0326925 | A1* | 12/2009 | Crider | G06F 8/30 704/9 |
| 2010/0211379 | A1* | 8/2010 | Gorman | G06F 17/2785 704/9 |
| 2011/0213610 | A1 | 9/2011 | Chen et al. | |
| 2012/0253793 | A1* | 10/2012 | Ghannam | G06F 17/2785 704/9 |
| 2014/0032209 | A1 | 1/2014 | Etzioni et al. | |
| 2014/0088955 | A1* | 3/2014 | Kim | H04M 1/72522 704/9 |
| 2015/0039295 | A1 | 2/2015 | Soschen | |
| 2015/0199331 | A1 | 7/2015 | Anisimovich et al. | |

OTHER PUBLICATIONS

Raquel Mochales, et al., "Argumentation Mining," Artificial Intelligence and Law Mar. 2011, vol. 19, Issue 1, pp. 1-22.
Steven Bethard, et al., "Extracting Opinion Propositions and Opinion Holders Using Syntactic and Lexical Cues," Computing Attitude and Affect in Text: Theory and Applications vol. 20 of the series The Information Retrieval Series pp. 125-141.
Christian Stab, et al., "Detecting Arguement Components and Structures," 2015, Computer Science Department, Technische Universitat Darmstadt, pp. 1-23.

* cited by examiner

*Primary Examiner* — Abul Azad
(74) *Attorney, Agent, or Firm* — F. Chau & Associates, LLC

(57) ABSTRACT

A method for automatically extracting claim candidates from complex sentences includes providing a parse tree of a text sample to be analyzed, disassembling the parse tree into a set of basic meaning-bearing clauses, assembling clauses of the set of basic clauses into a set of complex coherent statements based on permissible syntactic structures, testing the complex statements and discarding those statements that are not coherent when considered alone, discarding those complex statements that either do not provide additional information about a subject, or are too complex, removing information from a complex statement that provides supportive details about the subject, and discarding statements that restrict their subject, so that the subject cannot be generalized encompass a broader subject.

20 Claims, 6 Drawing Sheets

| Dependent | Independent |
|---|---|
| Although she is hungry | She will give him some of her food |

US 9,652,450 B1

RULE-BASED SYNTACTIC APPROACH TO CLAIM BOUNDARY DETECTION IN COMPLEX SENTENCES

BACKGROUND

Technical Field

Embodiments of the present disclosure are directed to methods and systems that can automatically extract grammatically well-formed statements from a complex sentence that are suitable as claim candidates of a debatable topic.

Discussion of the Related Art

Decision support systems provide an automatic way for the compilation of useful information to make decisions. One method of decision making is to analyze the pros- and cons- of alternative actions that can meet decision objectives from different perspectives. Debating is an example of decision making where arguments that sustain or contradict a topic can help clarify and support deliberation. Arguments, also called claims, are short statements that are expressive enough to adopt a clear position on a specific topic. Automatic claim extraction is useful for topics that are evolving very quickly or have a wide variety of perspectives, i.e. are subjective.

A claim is (A) a generic, concise statement that (B) directly supports or contests a specific topic. This definition covers two aspects of a claim: a syntactic aspect (A) and a semantic aspect (B).

A claim should be an intelligible and coherent utterance, easy to understand when taken out of its immediate context, such as a sentence or paragraph, but provided with the topic that it either contests or supports.

In the context of a debatable topic, a claim expresses a specific position on some doubtful or controversial issue that an arguer wants an audience to accept. That means that additional information, such as additional verbal phrases and arguments, to support or contest the specific issue or subject are provided.

In natural languages, propositions, also called clauses, generally represent the basic unit for conveying information about a predicate of a subject. A clause is a grammatical unit that includes, at a minimum, a predicate and an explicit or implied subject, and expresses a proposition. An independent clause is a simple sentence and can stand on its own. A dependent clause cannot stand on its own, but needs an independent clause to complete the sentence. The table of FIG. 1 illustrates some examples of dependent and independent clauses. A clause generally includes at least a subject and a verb (S-V). There are 7 basic clause patterns in English: SV, SVO, SVC, SVA, SVOO, SVOA and SVOC, where C is a complement and A is an adverbial, of which only the first pattern does not align with the requirements of a claim.

Clauses can be combined in different ways in a sentence to express related information, which determines the complexity of a sentence: there are simple sentences, which have one independent clause, compound sentences, which have two or more independent clauses, and complex sentences, which have at least an independent clause and one or more dependant clauses.

The task of well-structured claim candidate identification, according to part A of the definition, can therefore be translated into a combination of clause extraction (conciseness), and their integration into coherent statements which are filtered by claim-related constraints (generality).

SUMMARY

There are currently no methods/systems that can automatically identify and extract grammatically well-formed claim candidates, claims that are coherent, concise and generic, from complex sentences that are highly probable to contain claims. Existing approaches are probabilistic in nature and require an annotated set of example to compute the priors. Moreover, the results of these probabilistic approaches are a mixture of both grammatically well- and ill-formed candidates, and it is challenging to define a measure of conciseness over them.

Exemplary embodiments of the present disclosure provide methods for automatically detecting claim boundary candidates within a complex sentence that is probable to contain claims. Further, exemplary embodiments of the present disclosure provide methods for extracting grammatically well-formed claim candidates from a parse tree that are coherent, concise and generic, that employ a system of rules over constituency-based syntactic trees, and rely on syntactic constituent parsing technology. Methods according to embodiments of the disclosure do not require training data to learn from, and can work across different text domains.

According to an embodiment of the disclosure, there is provided a method for automatically extracting claim candidates from complex sentences, including (a) providing a parse tree of a text sample to be analyzed, (b) disassembling the parse tree into a set of basic meaning-bearing clauses, (c) assembling clauses of the set of basic clauses into a set of complex coherent statements based on permissible syntactic structures, (d) testing the complex statements and discarding those statements that are not coherent when considered alone, (e) discarding those complex statements that either do not provide additional information about a subject, or are too complex, (f) removing information from a complex statement that provides supportive details about the subject, and (g) discarding statements that restrict their subject, so that the subject cannot be generalized encompass a broader subject.

According to a further embodiment of the disclosure, the method includes ranking remaining statements based on their complexity, wherein a set of candidate statements ranked according to their complexity is output.

According to a further embodiment of the disclosure, ranking remaining statements based on their complexity comprises aggregating scores for each remaining statement based on the length of each statement in words, and scores calculated for each statement at steps (c) through (g), wherein the score for each statement calculated at each of steps (c) through (g) is a measure of the complexity of said statement at said step.

According to a further embodiment of the disclosure, assembling clauses of the set of basic clauses into a set of complex coherent statements comprises forming a complex statement from a combination of an independent basic clause and at least one dependent basic clause.

According to a further embodiment of the disclosure, testing the complex statements and discarding those statements that are not coherent when considered alone comprises separating compound statements into simple statements, and discarding statements without a subject being expressed.

According to a further embodiment of the disclosure, discarding those complex statements that either do not provide additional information about a subject, or are too complex comprises discarding statements that are simple sentences with no object or complement.

According to a further embodiment of the disclosure, discarding those complex statements that either do not provide additional information about a subject, or are too complex comprises discarding complex statements that span more than 2 levels of complexity.

According to a further embodiment of the disclosure, removing information that provides supportive details comprises one or more of removing unnecessary words from a statement, removing an indirect object at a beginning of a prepositional phrase or an adverb phrase, removing an indirect object at an end of a statement, and words that indicate a list of examples, and removing a start coordination from a noun phrase and an end coordination from a noun phrases or a prepositional phrase.

According to a further embodiment of the disclosure, discarding statements that restrict their subject comprises discarding statements that restrict the subject matter of the statement.

According to a further embodiment of the disclosure, discarding statements that restrict their subject comprises discarding statements which refer to specific cases or knowledge based on hints from part-of-speech tags and extracted information.

According to an embodiment of the disclosure, there is provided a non-transitory program storage device readable by a computer, tangibly embodying a program of instructions executed by the computer to perform the method steps for automatically extracting claim candidates from complex sentences.

DETAILED DESCRIPTION OF EXEMPLARY EMBODIMENTS

Figures 1, 2:
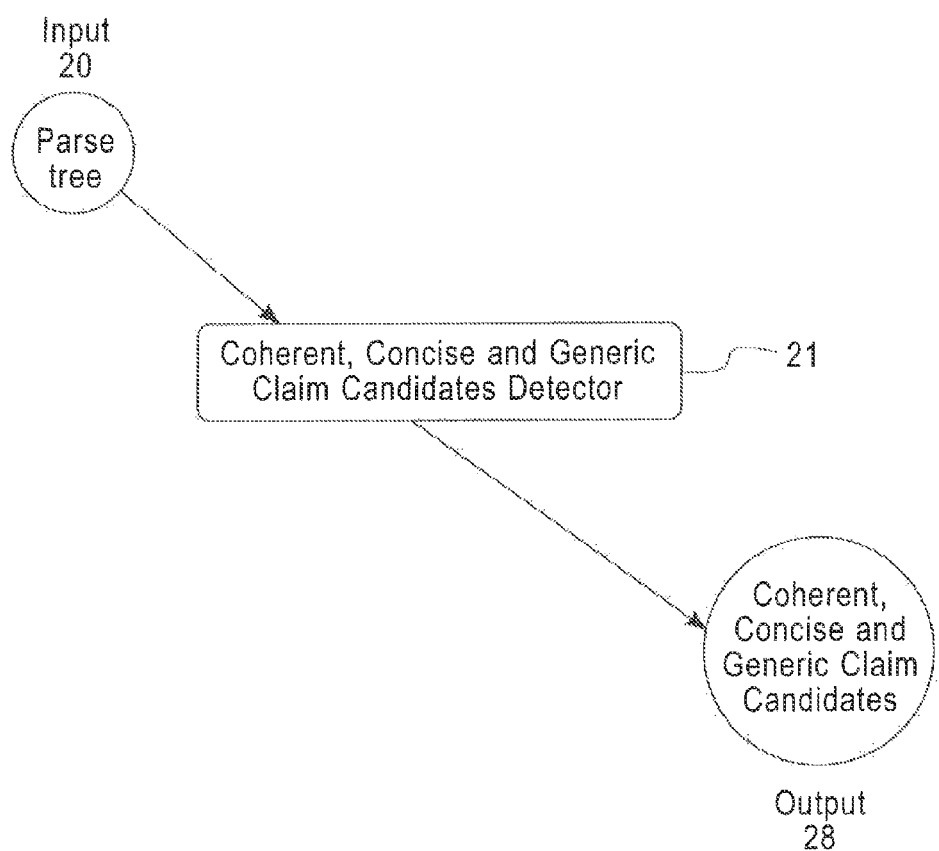
FIG. 1 is a table that illustrates some examples of dependent and independent clauses according to embodiments of the disclosure.
FIG. 2 is a block diagram of a simplified architecture of a system according to an embodiment of the disclosure.

Exemplary embodiments of the disclosure as described herein generally include unsupervised methods for automatically detecting claim candidates within a complex sentence that is probable to contain claims. Embodiments are described, and illustrated in the drawings, in terms of functional blocks, units or steps. Those skilled in the art will appreciate that these blocks, units or steps can be physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units or steps being implemented by microprocessors or similar, they may be programmed using software, such as microcode, to perform various functions discussed herein and may optionally be driven by firmware and/or software. Alternatively, each block, unit or step may be implemented by dedicated hardware, or as a combination of dedicated hardware to perform some functions and a processor, such as one or more programmed microprocessors and associated circuitry, to perform other functions. Also, each block, unit or step of the embodiments may be physically separated into two or more interacting and discrete blocks, units or steps without departing from the scope of the disclosure. Further, the blocks, units or steps of the embodiments may be physically combined into more complex blocks, units or steps without departing from the scope of the disclose. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure. In addition, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Exemplary embodiments of the present disclosure include a workflow that enables automatic detection of syntactically well-formed claim boundary candidates within a complex sentence that are probable to contain claims, i.e., semantically relates to a given topic, and a set of syntactic rules for extracting coherent statements and discarding unnecessary details, i.e., prefer conciseness over verbosity. Exemplary embodiments of the present disclosure are directed to the syntactic aspect of a claim and assume that the semantic aspect is given through the nature of the input data, namely a sentence that probably contains sub-spans deemed to be claims.

As an example, consider the sentence the topic "This House would legalize polygamy" and sentence "Almost all western countries prohibit polygamy, but several recognize polygamous marriages entered into in countries that permit them." An expected result would be "Almost all western countries prohibit polygamy."

FIG. 2 is a block diagram of a simplified architecture of a system according to an embodiment of the disclosure. Referring to the figure, a system according to an embodiment takes as input a parse tree 20 of a text sample to be analyzed, a detector 21 that can detect coherent, concise and generic claim candidates, and outputs these coherent, concise and generic claim candidates 28.

Coherence is a term of text linguistics that is used to refer to sense relations between single units, such as sentences or propositions, of a text. Due to these relations, the text appears to be logically and semantically consistent to a reader-listener.

Conciseness is the extent to which a piece of writing is efficient, i.e., it communicates clear information in as few words as possible.

Generic is the extent to which a piece of writing is very comprehensive, pertains or is appropriate to large classes or groups, as opposed to specific.

Figure 3:
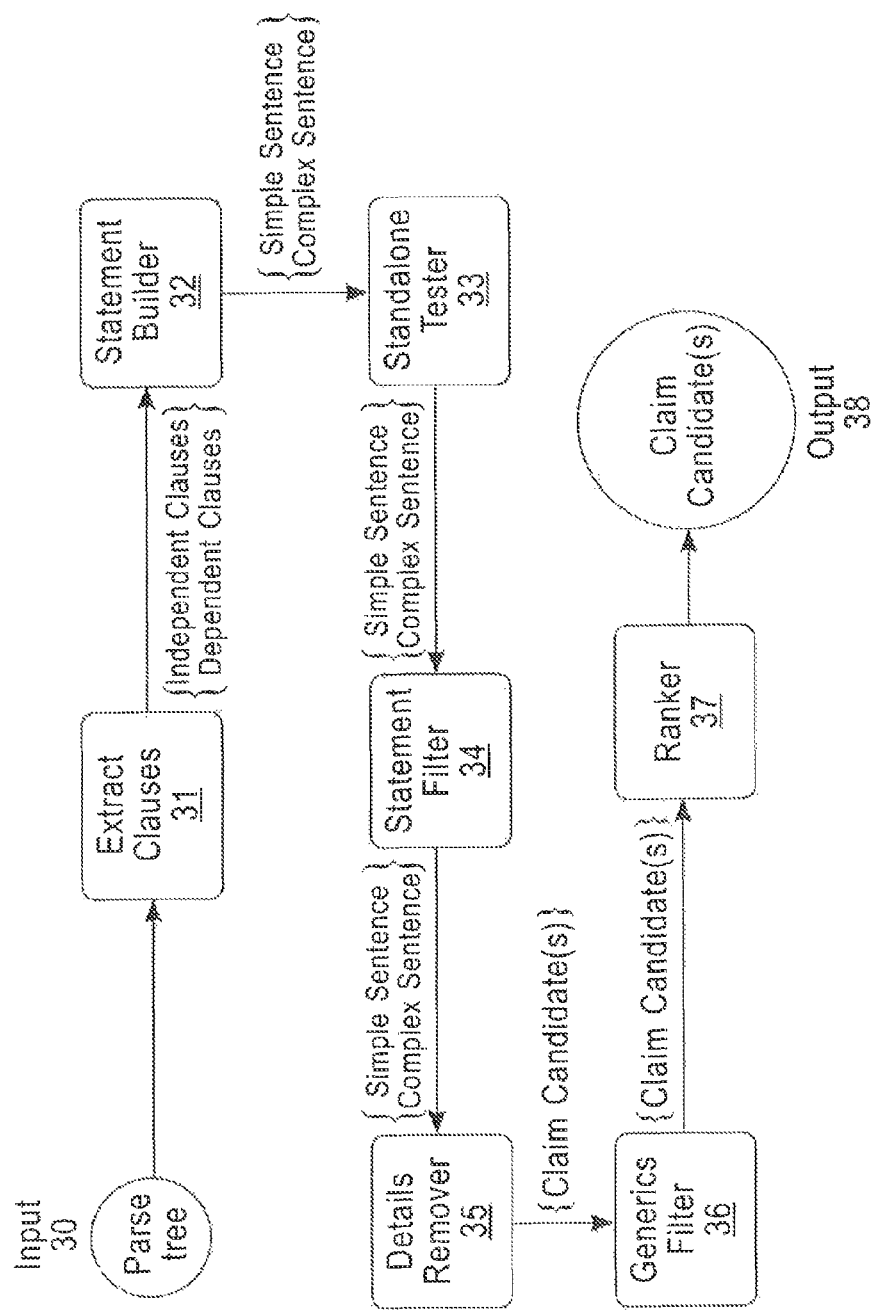
FIG. 3 is a flow chart of a method according to an embodiment of the disclosure.

FIG. 3 is a flow chart of a method according to an embodiment of the disclosure. Referring to the figure, a method according to an embodiment takes as input a parse tree 30 of a text sample to be analyzed and includes steps for extracting clauses 31 that yields a set of independent clauses and dependent clauses from the parse tree, building statements 32 that yields a set of simple sentences and complex sentences from the set of independent clauses and dependent clauses, standalone testing 33 that yields another set of simple sentences and complex sentences from the set of simple sentences and complex sentences, filtering statements 34 that further refines the set of simple sentences and complex sentences, removing details 35 that yields a set of candidates from the set of simple sentences and complex sentences, filtering generics 36 that refines the set of candidates, and ranking 37, which outputs the claim candidates 38, where the bracketed text between blocks indicates the intermediate data objects. These steps will be explained in detail below.

Figure 4:
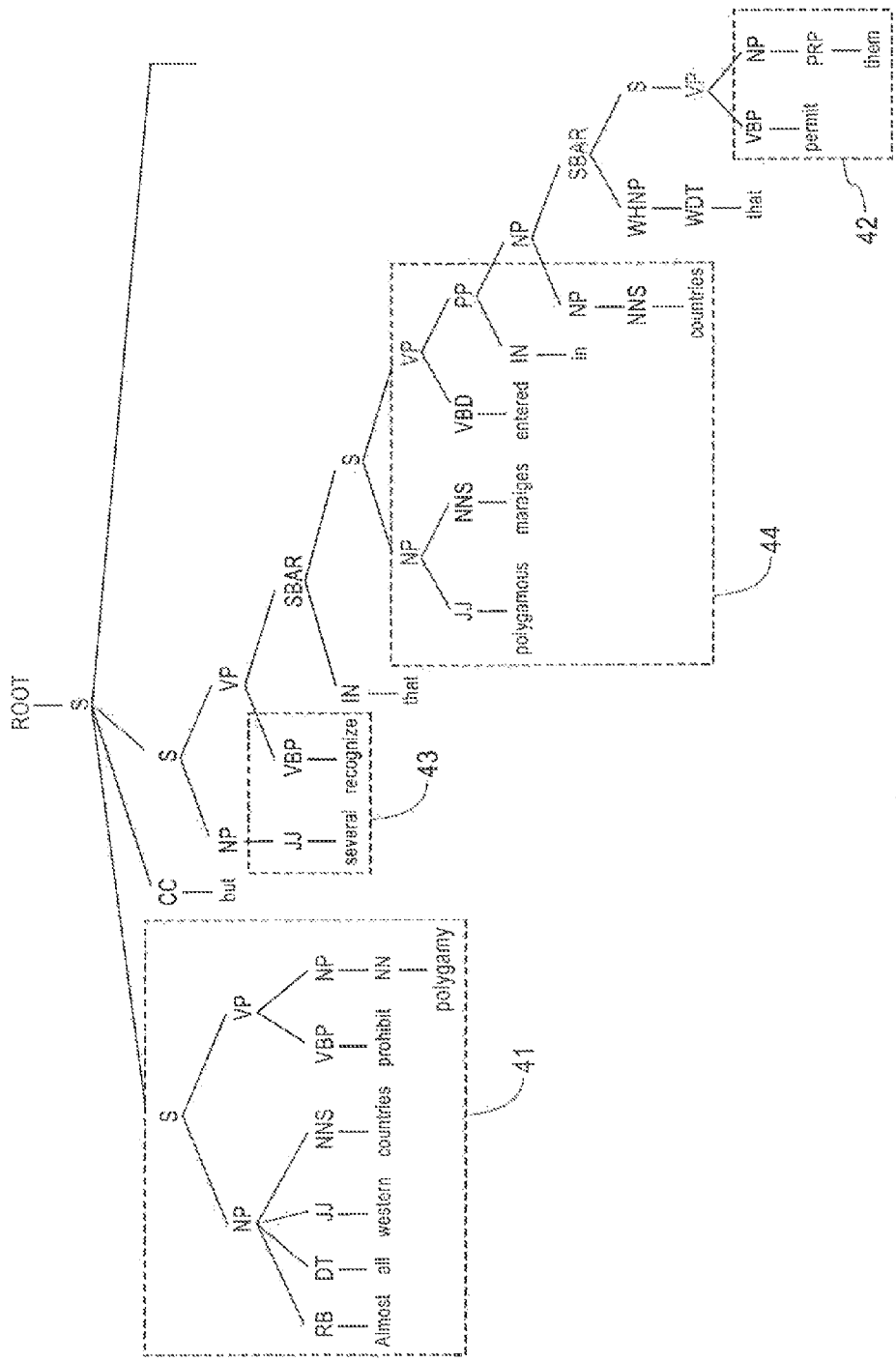
FIG. 4 illustrates a parse tree for extracting clauses, according to an embodiment of the disclosure.

FIG. 4 illustrates a parse tree 40 for extracting clauses, according to an embodiment of the disclosure. The parse tree 40 of FIG. 4 represents the syntactic structure of the sentence "Almost all western countries prohibit polygamy, but several recognize that polygamous marriages entered in countries that permit them." Note that a complete glossary of the symbols used in the tree is provided in an appendix at the end of this disclosure. Referring to FIG. 4, syntactic parsing marks simple declarative clauses as S, and dependent clauses as SBAR, but does not directly mark independent clauses. Rather, an independent clause is difference between an S and an SBAR span of the tree. A clause extracting step 31 according to an embodiment disassembles the parse tree into a set of basic meaning-bearing statements or clauses. For the example being considered, the basic meaning-bearing statements of the sentence of parse tree 40 are shaded into blocks 41, 42, 43, 44, for, respectively, "Almost all western countries prohibit polygamy", "permit them", "several recognize", and "polygamous marriages entered in countries".

Figure 5:
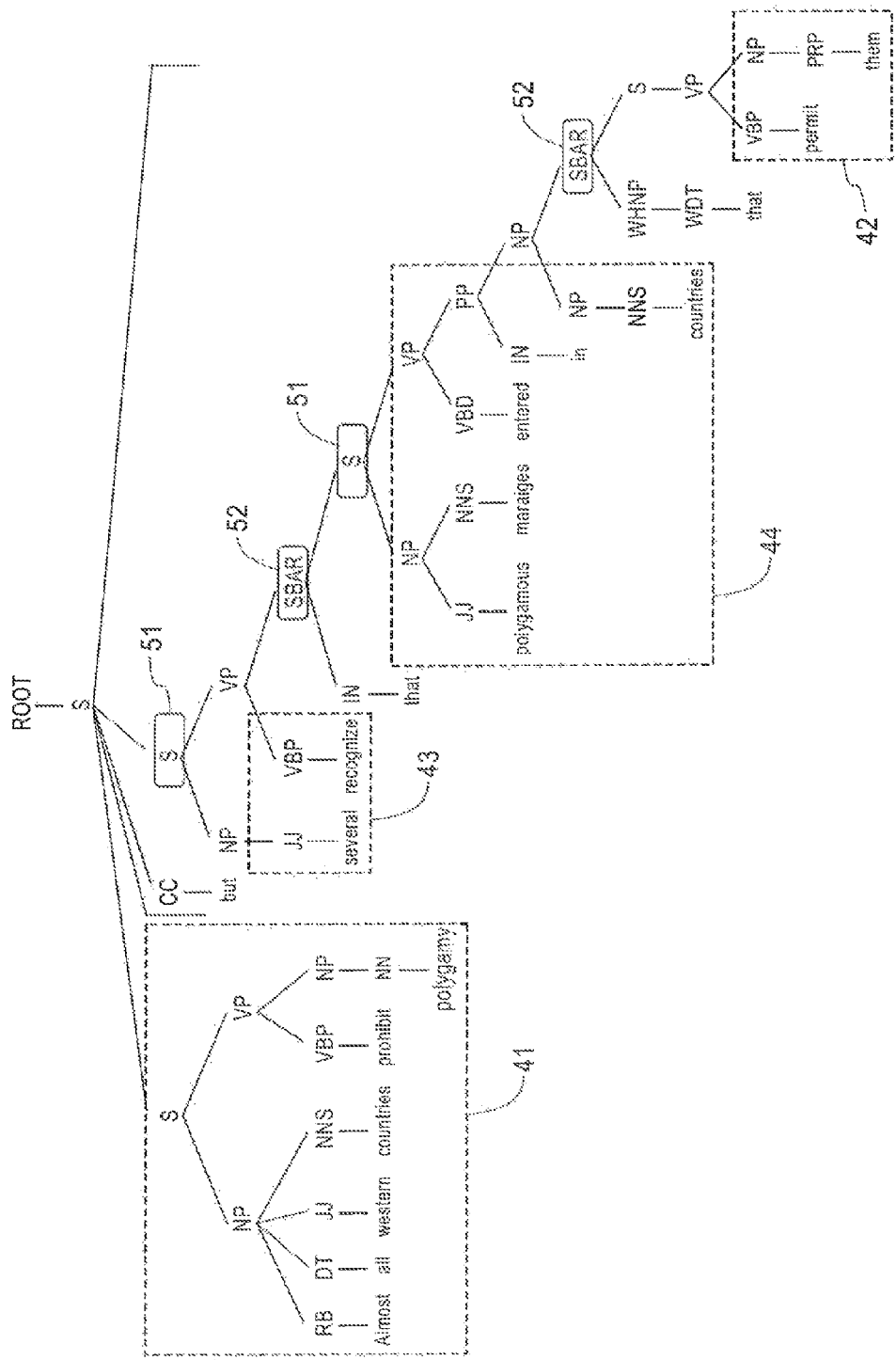
FIG. 5 illustrates a parse tree for building statements, according to an embodiment of the disclosure.

FIG. 5 illustrates the parse tree 40 as used for building statements, according to an embodiment of the disclosure. A statement building step 32 according to an embodiment assembles the basic clauses 41, 42, 43, and 44 found by the clause extracting step 31 into more complex coherent statements according to permissible syntactic structures. This can be accomplished by a rule SB1: Build complex sentences as a combination of an independent clause 51, labeled S in the parse tree, and at least one dependent clause 52, labeled SBAR in the parse tree. The example sentence presented above, "Almost all western countries prohibit polygamy, but several recognize that polygamous marriages entered in countries that permit them", is an example of a compound sentence. The complex statements include "several recognize that polygamous marriages entered in countries that permit them", "several recognize that polygamous marriages entered in countries", and "polygamous marriages entered in countries that permit them". Note that although the examples illustrated hereinabove are based on the English language, embodiments of the disclosure can be adapted for the syntactic structures of any known language.

A standalone filtering step 33 according to an embodiment tests and discards statements that are not coherent when considered alone. The statements are tested against one or more rules concerning the syntactic structure of the statements. For example, two rules according to an embodiment are as follows:

ST1: Remove compound sentences and separate them into simple sentences;

ST2: Discard sentences with a subject not being expressed (S-V-O).

Based on rule ST1, the original compound sentences would be removed. Based on rule ST2, the basic statement "permit them" would be discarded. Rules SB1, ST1, and ST2, and the rules that follow, can be applied to the parse tree to create new statements.

A statement filtering step 34 according to an embodiment discards statements that either do not provide additional information about a subject, or are too complex or verbose, based on additional rules concerning the syntactic structure of the statements. These rules include, but are not limited to:

SF1: Discard simple sentences with no object or complement (S-V pattern);

SF2: Discard complex sentences spanning more than 2 levels of complexity. Here, the complexity levels can be determined by the number of Ss in the parse tree.

Rule SF2 accounts for the conciseness of a claim. Based on rule SF1, the basic statement "several recognize" would be discarded. Application of rule SF2 would discard the complex statement "several recognize that polygamous marriages entered in countries that permit them".

A removing details step 35 according to an embodiment removes information from a statement that provides supportive details about a subject, again based on additional rules concerning the syntactic structure of the statements. These rules include, but are not limited to:

DR1: Remove unnecessary words (accounts mainly for the conciseness of the claim);

DR2: Remove indirect object at the beginning (PP, ADVP), where PP indicates a prepositional phrase, and ADVP indicates an adverb phrase;

DR3: remove indirect object at the end, & "for example", "including";

DR4: remove start coordination of NPs and end coordination of NPs, PPs, where NP indicates a noun phrase.

An example of the application of rule DR2 to the sentence "John, the son of Catherine, ate two apples" would be the removal of the apposition "the son of Catherine", leaving "John ate two apples." This rule helps keep a message shorter and clearer.

Examples of the application of rule DR2 include "By charging higher prices than the equilibrium rate, <CLAIM> the unions promote a deadweight loss. </CLAIM>" and "Furthermore, <CLAIM> numerous researchers have proposed potential positive effects of video games on aspects of social and cognitive development and psychological well-being </CLAIM>".

An example of the application of rule DR3 includes "Recent research has suggested that <CLAIM> some violent video games may actually have a prosocial effect in some contexts </CLAIM>, for example, team play."

An example of the application of rule DR4 includes "<CLAIM> Unity without diversity results in cultural repression </CLAIM> and hegemony." Start and end coordination refers to coordinating phrases such as CC (coordinating conjunctions) and CONJP (conjunction phrases). In this example, the end coordination that was removed is "and hegemony". A start coordination removal would remove "John and" from the statement "John and Maria ate two apples", leaving "Maria ate two apples".

In each of these examples, the claim itself is bracketed by the <CLAIM> . . . </CLAIM> pairs.

A generic filtering step 36 according to an embodiment discards statements that restrict their proposition, so that they cannot be generalized to deal with a relatively broad idea, also based on additional rules concerning the syntactic structure of the statements. These rules include, but are not limited to:

GF1: discard statements that restrict the subject being talked about;

GF2: discard statements based on hints from part-of-speech tags (e.g., proper nouns) and information extraction (e.g., named entities), which refer to specific cases or knowledge.

Referring back to the sentence of parse tree 40, application of rule GF1 would discard the complex statement "several recognize that polygamous marriages entered in countries". According to embodiments, statements that restrict the subject being talked about can be recognized by comparison with the current topic, "This House would legalize polygamy."

An example of the application of Rule GF2, consider a statement that refers to a habit of a single person. Such a statement is not general. For example, "John eats 3 apples each day" is not sufficiently general as it does not mean that each person has this habit.

A ranking step 37 according to an embodiment ranks candidates based on a set of scores computed in previous steps: an R1 score computed by the generics filtering step 36; an R2 score based on the length of the claim in terms of words; and an R3 score based on scores that were incrementally computed in the statement building step 32, the standalone testing step 33, the statement filtering step 34, and the removing details step 35. According to embodiments, an R1 score uses a list of words that, when found as part of the subject of a statement, strongly suggest a common sense knowledge, i.e., a generic statement. Examples of such words include all, every, any, etc. In addition, an R1 score according to an embodiment considers constructions known as "bare plurals", i.e., plural nouns without an article, such as "Humans are intelligent mammals." The R3 scores for the individual steps are measures of the complexity of the statements output by the step, and can be computed by any suitable method. According to some embodiments, the score value increases for increasing complexity. According to other embodiments, the score value decreases for increasing complexity. The scores can be aggregated by any known method, such as averaging. The aggregated scores are ranked from least to greatest. The meaning of the aggregated scores depends on the whether the individual step scores increase for increasing complexity, or decrease for increasing complexity, i.e., the aggregate score will increase for increasing complexity if the individual step scores increase for increasing complexity, and will decrease for increasing complexity if the individual step scores decrease for increasing complexity. The output of the ranker 37 is a ranked set of claim candidates 38.

System Implementations

It is to be understood that embodiments of the present disclosure can be implemented in various forms of hardware, software, firmware, special purpose processes, or a combination thereof. In one embodiment, an embodiment of the present disclosure can be implemented in software as an application program tangible embodied on a computer readable program storage device. The application program can be uploaded to, and executed by, a machine comprising any suitable architecture. Furthermore, it is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. An automatic troubleshooting system according to an embodiment of the disclosure is also suitable for a cloud implementation.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 6:
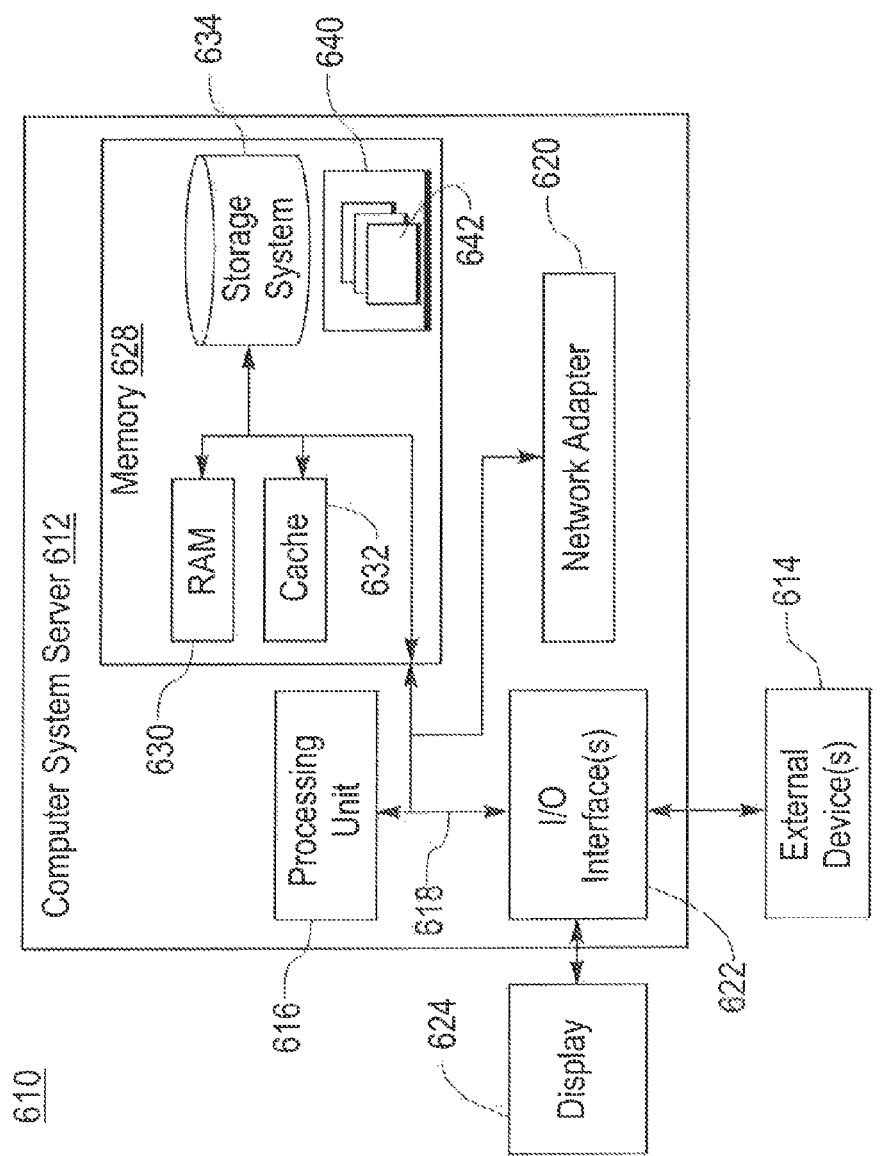
FIG. 6 is a schematic of an exemplary cloud computing node that implements an embodiment of the disclosure.

Referring now to FIG. 6, a schematic of an example of a cloud computing node is shown. Cloud computing node 610 is only one example of a suitable cloud computing node and is not intended to suggest any limitation as to the scope of use or functionality of embodiments of the disclosure described herein. Regardless, cloud computing node 610 is capable of being implemented and/or performing any of the functionality set forth hereinabove.

In cloud computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the disclosure.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the disclosure as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

Figure 7:
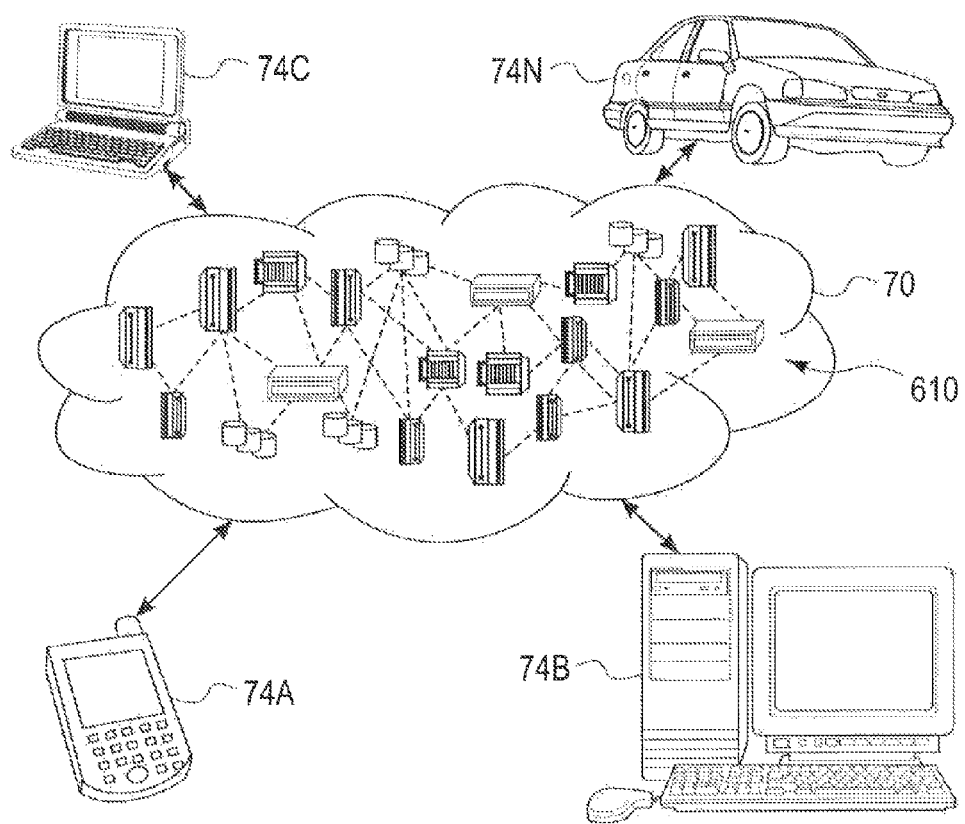
FIG. 7 shows an exemplary cloud computing environment according to embodiments of the disclosure.

Referring now to FIG. 7, illustrative cloud computing environment 70 is depicted. As shown, cloud computing environment u0 comprises one or more cloud computing nodes 610 with which local computing devices used by cloud consumers, such as, for example, personal digital assistant (PDA) or cellular telephone 74A, desktop computer 74B, laptop computer 74C, and/or automobile computer system 74N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 70 to offer infrastructure, platforms and/or software as services for which a cloud consumer does not need to maintain resources on a local computing device. It is understood that the types of computing devices 74A-N shown in FIG. 7 are intended to be illustrative only and that computing nodes 610 and cloud computing environment 70 can communicate with any type of computerized device over any type of network and/or network addressable connection (e.g., using a web browser).

While embodiments of the present disclosure has been described in detail with reference to exemplary embodiments, those skilled in the art will appreciate that various modifications and substitutions can be made thereto without departing from the spirit and scope of the disclosure as set forth in the appended claims.

GLOSSARY OF LINGUISTIC TAGS

S—simple declarative clause,
SBAR—Clause introduced by a (possibly empty) subordinating conjunction.
DT—Determiner
IN—Preposition or subordinating conjunction
JJ—Adjective
NN—Noun, singular or mass
NNS—Noun, plural
NP—Noun Phrase.
PP—Prepositional Phrase
PRP—Personal pronoun
RB—Adverb
VBD—Verb, past tense
VBP—Verb, non-3rd person singular present
VP—Verb Phrase
WDT—Wh-determiner
WHNP—Wh-noun Phrase. Introduces a clause with an NP gap.

What is claimed is:

1. A computer-implemented method for automatically extracting claim candidates from complex sentences, the method executed by a processor of the computer comprising the steps of:
   (a) providing a parse tree of a text sample to be analyzed;
   (b) disassembling the parse tree into a set of basic meaning-bearing clauses;
   (c) assembling clauses of the set of basic clauses into a set of complex coherent statements based on permissible syntactic structures;
   (d) testing the complex statements and discarding those statements that are not coherent when considered alone;
   (e) discarding those complex statements that either do not provide additional information about a subject, or are too complex;
   (f) removing information from a complex statement that provides supportive details about the subject; and
   (g) discarding statements that restrict their subject, so that the subject cannot be generalized encompass a broader subject.

2. The method of claim 1, further comprising ranking remaining statements based on their complexity, wherein a set of candidate statements ranked according to their complexity is output.

3. The method of claim 2, wherein ranking remaining statements based on their complexity comprises aggregating scores for each remaining statement based on the length of each statement in words, and scores calculated for each statement at steps (c) through (g), wherein the score for each statement calculated at each of steps (c) through (g) is a measure of the complexity of said statement at said step.

4. The method of claim 1, wherein assembling clauses of the set of basic clauses into a set of complex coherent statements comprises forming a complex statement from a combination of an independent basic clause and at least one dependent basic clause.

5. The method of claim 1, wherein testing the complex statements and discarding those statements that are not coherent when considered alone comprises separating compound statements into simple statements, and discarding statements without a subject being expressed.

6. The method of claim 1, wherein discarding those complex statements that either do not provide additional information about a subject, or are too complex comprises discarding statements that are simple sentences with no object or complement.

7. The method of claim 1, wherein discarding those complex statements that either do not provide additional information about a subject, or are too complex comprises discarding complex statements that span more than 2 levels of complexity.

8. The method of claim 1, wherein removing information that provides supportive details comprises one or more of removing unnecessary words from a statement, removing an indirect object at a beginning of a prepositional phrase or an adverb phrase, removing an indirect object at an end of a statement, and words that indicate a list of examples, and removing a start coordination from a noun phrase and an end coordination from a noun phrases or a prepositional phrase.

9. The method of claim 1, wherein discarding statements that restrict their subject comprises discarding statements that restrict the subject matter of the statement.

10. The method of claim 1, wherein discarding statements that restrict their subject comprises discarding statements which refer to specific cases or knowledge based on hints from part-of-speech tags and extracted information.

11. A non-transitory program storage device readable by a computer, tangibly embodying a program of instructions executed by a processor of the computer to perform the method steps for automatically extracting claim candidates from complex sentences, the method performed by the processor comprising the steps of:
   (a) providing a parse tree of a text sample to be analyzed;
   (b) disassembling the parse tree into a set of basic meaning-bearing clauses;
   (c) assembling clauses of the set of basic clauses into a set of complex coherent statements based on permissible syntactic structures;
   (d) testing the complex statements and discarding those statements that are not coherent when considered alone;
   (e) discarding those complex statements that either do not provide additional information about a subject, or are too complex;

(f) removing information from a complex statement that provides supportive details about the subject; and (g) discarding statements that restrict their subject, so that the subject cannot be generalized encompass a broader subject.

12. The computer readable program storage device of claim 11, the method further comprising ranking remaining statements based on their complexity, wherein a set of candidate statements ranked according to their complexity is output.

13. The computer readable program storage device of claim 12, wherein ranking remaining statements based on their complexity comprises aggregating scores for each remaining statement based on the length of each statement in words, and scores calculated for each statement at steps (c) through (g), wherein the score for each statement calculated at each of steps (c) through (g) is a measure of the complexity of said statement at said step.

14. The computer readable program storage device of claim 11, wherein assembling clauses of the set of basic clauses into a set of complex coherent statements comprises forming a complex statement from a combination of an independent basic clause and at least one dependent basic clause.

15. The computer readable program storage device of claim 11, wherein testing the complex statements and discarding those statements that are not coherent when considered alone comprises separating compound statements into simple statements, and discarding statements without a subject being expressed.

16. The computer readable program storage device of claim 11, wherein discarding those complex statements that either do not provide additional information about a subject, or are too complex comprises discarding statements that are simple sentences with no object or complement.

17. The computer readable program storage device of claim 11, wherein discarding those complex statements that either do not provide additional information about a subject, or are too complex comprises discarding complex statements that span more than 2 levels of complexity.

18. The computer readable program storage device of claim 11, wherein removing information that provides supportive details comprises one or more of removing unnecessary words from a statement, removing an indirect object at a beginning of a prepositional phrase or an adverb phrase, removing an indirect object at an end of a statement, and words that indicate a list of examples, and removing a start coordination from a noun phrase and an end coordination from a noun phrases or a prepositional phrase.

19. The computer readable program storage device of claim 11, wherein discarding statements that restrict their subject comprises discarding statements that restrict the subject matter of the statement.

20. The computer readable program storage device of claim 11, wherein discarding statements that restrict their subject comprises discarding statements which refer to specific cases or knowledge based on hints from part-of-speech tags and extracted information.

* * * * *